United States Patent [19]

Lee et al.

[11] Patent Number: 5,348,771
[45] Date of Patent: Sep. 20, 1994

[54] METHOD OF PRODUCING AN OXYGEN BARRIER COATING CONTAINING TRIMETHOXYSILYL FUNCTIONAL PENTADIENOATE

[75] Inventors: Chi-Long Lee; Ming-Hsiung Yeh, both of Midland, Mich.

[73] Assignee: Dow Corning Corporation, Midland, Mich.

[21] Appl. No.: 155,039

[22] Filed: Nov. 19, 1993

[51] Int. Cl.$^5$ ............................................. B05D 3/06
[52] U.S. Cl. .................................... 427/515; 427/520; 522/99; 522/172
[58] Field of Search ................... 427/508, 515, 520; 522/99, 172

[56] References Cited

U.S. PATENT DOCUMENTS

| | | | |
|---|---|---|---|
| 4,254,169 | 3/1981 | Schroeder | 482/35 |
| 4,421,823 | 12/1983 | Theisen et al. | 428/349 |
| 4,464,443 | 8/1984 | Farrell et al. | 428/688 |
| 4,495,249 | 1/1985 | Ohya et al. | 428/516 |
| 4,501,797 | 2/1985 | Super et al. | 428/349 |
| 4,547,433 | 10/1985 | Ohya et al. | 428/516 |
| 4,557,780 | 12/1985 | Newsome et al. | 156/244 |
| 4,561,920 | 12/1985 | Foster | 156/244 |
| 4,572,854 | 2/1986 | Dallmann et al. | 428/35 |
| 4,643,926 | 2/1987 | Mueller | 428/35 |
| 4,755,402 | 7/1988 | Oberle | 428/35 |
| 4,803,126 | 2/1989 | Wyman | 428/447 |
| 4,833,024 | 5/1989 | Mueller | 428/349 |
| 4,853,265 | 8/1989 | Warren | 428/34.9 |
| 4,855,183 | 8/1989 | Oberle | 428/345 |
| 4,886,690 | 12/1989 | Davis et al. | 428/36.6 |
| 4,891,253 | 1/1990 | Mueller | 428/35.2 |
| 4,911,986 | 3/1990 | Keryk et al. | 428/447 |
| 5,004,647 | 4/1991 | Shah | 428/349 |
| 5,009,924 | 4/1991 | Wyman | 427/44 |
| 5,077,135 | 12/1991 | Wyman | 428/447 |
| 5,096,738 | 3/1992 | Wyman | 427/44 |
| 5,136,065 | 8/1992 | Yeh | 556/415 |
| 5,215,822 | 6/1993 | Wyman et al. | 428/447 |
| 5,231,157 | 7/1993 | Herzig et al. | 528/15 |
| 5,279,898 | 1/1994 | Evans et al. | 428/402.21 |

FOREIGN PATENT DOCUMENTS 9200353-2 10/1993 Sweden .
2139948A 5/1983 United Kingdom .

Primary Examiner—Terry J. Owens
Assistant Examiner—Erma Cameron
Attorney, Agent, or Firm—Richard I. Gearhart

[57] ABSTRACT

A composite films which exhibit low oxygen transmission rates. The film comprises a silane resin coated on a plastic substrate then cured by ultraviolet radiation. For the silane coating, this invention relies on a class of organosilicon compounds derived from 1) organohydrogensilanes or organohydrogensiloxanes and 2) propargyl esters of carboxylic acids containing a terminal aromatic hydrocarbon radical, where the carbopropynoxy group of the ester and the aromatic hydrocarbon radical are separated by at least two adjacent ethylenically unsaturated carbon atoms. If more than two of these carbon atoms are present they form a sequence of conjugated ethylenic double bonds which allows the polymer to cross-link upon exposure to ultraviolet radiation.

8 Claims, No Drawings

METHOD OF PRODUCING AN OXYGEN BARRIER COATING CONTAINING TRIMETHOXYSILYL FUNCTIONAL PENTADIENOATE

FIELD OF THE INVENTION

This invention relates to composite films generally, and composite films for applications requiring low oxygen transmission rates in particular.

BACKGROUND OF THE INVENTION

Packages allowing significant penetration of oxygen or other gases are undesirable where gas transmission contributes to the decay of the packaged product. For example, the development of packages having low oxygen transmission rates, i.e. high oxygen barrier properties, has long been a desirable objective in the food packaging industry, because low gas permeability food packages increase the shelf life of the packaged food products. Packages having low oxygen transmission rates also have utility for packaging other oxygen sensitive materials, such as oxygen activated sealants. Longer shelf life of the product increases inventory efficiency for distributors, and reduces the likelihood that the consumer will accidently purchase a contaminated product. For a plastic film to be qualified for food packaging applications, therefore, the film has to have low oxygen permeability not only at low relative humidity, but also at high relative humidity since the packed food may be stored in the high humidity environment. Unfortunately most of the commercially available plastic film cannot meet these two requirements simultaneously. The ideal film will have both low oxygen permeability and will be insensitive to relative humidity. The present invention solves these problems by teaching a silicone treated plastic film which exhibits excellent low gas transmission characteristics both at 0% relative humidity and at 85% relative humidity.

U.S. Pat. Nos. 5,077,135 and 5,096,738 to Wyman disclose a method of imbuing polymer films with gas impermeable surface characteristics using a silane compound and cross-linking same, while providing physical adsorption adherence to the film and with sufficient coating to produce gas and related barrier characteristics. However, the present invention is distinguishable from the '135 and '738 patents because the present invention teaches a silane which is cured by ultraviolet radiation rather than electron beam irradiation, which is taught as the cure method in the '135 and '738 patents.

SUMMARY OF INVENTION

The present invention relates to the preparation of composite films which exhibit low oxygen transmission rates. The film comprises a silane resin coated on a plastic substrate then cured by ultraviolet radiation.

For the silane coating, this invention relies on a class of organosilicon compounds derived from 1) organohydrogensilanes or organohydrogensiloxanes and 2) propargyl esters of carboxylic acids containing a terminal aromatic hydrocarbon radical, where the carbopropynoxy group of the ester and the aromatic hydrocarbon radical are separated by at least two adjacent ethylenically unsaturated carbon atoms. If more than two of these carbon atoms are present they form a sequence of conjugated ethylenic double bonds which allows the polymer to cross-link upon exposure to ultraviolet radiation.

The silicone resin is formed from an organosilane having the general formula

$$Z(R^1O)_3Si \qquad (1)$$

where Q represents the radical

$$R^2(CH=CH)_n-CH=CR^3C(O)R^5-,$$

each $R^1$ is individually selected from the group consisting essentially of unsubstituted monovalent hydrocarbon radicals, $R^2$ represents an aryl, alkoxyaryl or alkaryl radical, $R^3$ is selected from the group consisting essentially of $-C\equiv N$ and $-C(O)OR^4$ where $R^4$ is hydrogen or an unsubstituted monovalent hydrocarbon radical selected from the same group as $R^1$ $R^5$ is $-O(CH_2)_aCH=CH-$ or $-NR^6-(CH_2)_b-$, $R^6$ is a hydrogen or hydrocarbon radical having from 1 to 6 carbon atoms, a is 1 to 5, b is 3 to 6, and n is 0 or a positive integer, with the proviso that n can be 0 only when $R^2$ represents a naphthyl radical.

Description of the Preferred Embodiments

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

The preferred embodiment of the invention is a film consisting of a plastic substrate having disposed thereon a coating of silicone resin formed from a silane solution. The plastic material may, but need not be, a commercially available polyolefin, such as polyethylene, polypropylene, or polyethyleneterephthalate or a polyester, such as MYLAR available from DuPont, (Wilmington, Del.). The substrate may be any thickness, but will likely be at least 25 microns thick.

In the following embodiments and examples of the invention, the silicone resin is formed from an organosilane having the general formula:

$$Q(R^1O)_3Si \qquad (1)$$

where Q represents the radical
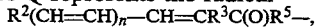
$$R^2(CH=CH)_n-CH=CR^3C(O)R^5-,$$

each $R^1$ is individually selected from the group consisting essentially of unsubstituted monovalent hydrocarbon radicals, $R^2$ represents an aryl, alkoxyaryl or alkaryl radical, $R^3$ is selected form the group consisting essentially of $-C\equiv N$ and $-C(O)OR^4$ where $R^4$ is hydrogen or an unsubstituted monovalent hydrocarbon radical selected from the same group as $R^1$, $R^5$ is $-O(CH_2)_aCH=CH-$ or $-NR^6-(CH_2)_b-$, $R^6$ is a hydrogen or hydrocarbon radical having from 1 to 6 carbon atoms, a is 1 to 5, b is 3 to 6, and n is 0 or a positive integer, with the proviso that n can be 0 only when $R^2$ represents a naphthyl radical.

The present inventor discovered, and disclosed in U.S. Pat. No. 5,136,065, that the platinum-catalyzed hydrosilylation reaction of an organohydrogensiloxane occurs exclusively at the propargyl group, resulting in a high yield of the desired product containing units of the formula $$R^2(CH=CH)_n-CH=CR^3C(O)R^5Si(OR^1)_3$$

(where $R^5$ is $-O(CH_2)_aCH=CH-$, and a, $R^2$, n, $R^3$, and $R^1$ are defined as above) rather than the expected mixture of products resulting from occurrence of the hydrosilylation reaction at the carbon-carbon double bonds or at the carbonyl portion of the carboxyl group as expected.

The organosilicon compounds of the present invention undergo an intermolecular coupling reaction in the presence of ultraviolet radiation in the range of 300 to 400 nm that is believed to involve formation of cyclobutane rings by pairs of ethylenically unsaturated carbon atoms on adjacent molecules of the compound. This reaction can be depicted as:

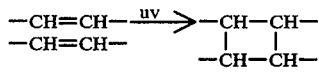

The substituent represented by $R^3$ in the present compounds can be a cyano ($-C≡N$) group or a group represented by the formula $-C(O)OR^4$ where $R^4$ is hydrogen or an unsubstituted monovalent hydrocarbon radical.

Unsubstituted monovalent hydrocarbon radicals that can be represented by $R^1$ and $R^4$ include but are not limited to alkyl radicals containing from 1 to 10 carbon atoms such as methyl, ethyl and propyl, cycloalkyl radicals such as cyclohexyl, aryl such as phenyl, alkaryl such as tolyl and xylyl and aralkyl such as benzyl. Most preferably $R^1$ is methyl, phenyl or 3,3,3-trifluoropropyl and $R^4$ is hydrogen.

$R^2$ represents an aryl, alkoxyaryl or alkaryl radical such as phenyl, o-, m-, or p-methoxyphenyl, naphthyl or tolyl. In preferred embodiments of the present compounds $R^2$ is phenyl, o-, m-, or p- methoxyphenyl or naphthyl and n is 0 or 1, this preference being based on the availability of the starting materials used to prepare this embodiment and the high yield of desired product in the absence of undesirable by-products when the propargyl ester is prepared using the Knoevenagel condensation reaction described in U.S. Pat. No. 5,136,065.

While the examples below set forth the oxygen transmission rates of the coated films, the silane coating disclosed herein can also be used in the multi-layer sandwich configuration disclosed in United States Patent Application entitled "Barrier Film For Packaging", Ser. No. 08/062,378 and United States Patent Application entitled "Film For Packaging Having Oxygen Barrier Characteristics", Ser. No. 08/124120, each the above applications being incorporated herein by reference.

EXAMPLES

The measurements of oxygen permeability for each of the composite films discussed in the following examples were made using pure oxygen on a MOCON OX-TRAN 100A tester according to the ASTM F1307-90 at 32.5° C. "Dry" readings were taken in an environment where the relative humidity was 0 percent and the "wet" readings were taken in an environment where the relative humidity was greater than 85 percent. Corona treatment of the substrates was done by passing the substrate under a Tesla Coil for approximately one-half second.

A silane compound, N-3-trimethoxysilylpropyl 2-cyano-5-phenyl-2,4-pentadienoamide, (hereinafter, "CPPDATMS") was prepared by mixing equal molar amounts of methyl 2-cyano-5-phenyl-2,4-pentadienoate (40 g) and 3-aminopropyltrimethoxysilane (33.69 g) together, then adding an equal weight of toluene (74 g). The mixture was heated at 85° C. until no starting material was shown in the IR spectra of the admixture. Removal of the toluene under reduced pressure afforded a yellow waxy solid.

After preparation of the silane compounds described above, three films were made from corona treated low density polyethylene (LDPE) substrates of 100 micron thickness. To make the film, the silane compound was dissolved in a solvent, such as acetone or methanol, itaconic acid and water. Then the corona treated LDPE film was coated on both sides. After coating, the light yellow, opaque coated film was allowed to dry for several minutes, then subjected to UV cure. The UV cure took place under an OAI 30 1000 Watt Near UV Flood Exposure System, (Optical Associates, Inc., Milpitas, Calif.) at 15 mw/cm². Irradiation time was 60 seconds for each side of the film which resulted in a clear, colorless film. Coating thickness of the silane layer of each film was estimated to be between 1 and 2 microns.

The table below shows the oxygen transmission data for various combinations of CPPDATMS in solution, the solvent amount and type, if the coated substrate was cured with UV irradiation, and the oxygen transmission rates, both wet and dry.

| | Oxygen Permeability (OP in cc/m²/day) of Trialkoxysilyl Functional Pentadienoate Coated LDPE Films | | | | |
|---|---|---|---|---|---|
| SOL. WT (g) | SOL WT (G) | H₂O WT (g) | Cure | OP DR | OP WET* |
| CONTROL | NONE | NONE | NONE | 2300 | — |
| CPPDATMS 10 | MEK 90 | 4 | uv | — | 1380 |
| CPPDATMS 5 IA 5 | MEK 90 | 4 | UV | 255 | 245 |
| CPPDATMS 5 IA 5 | MEK 90 | 4 | — | — | 345 |
| CPPDATMS 5 IA 5 | MeOH 90 | 4 | UV | 91 | 92 |

MEK = Methyl Ethyl Ketone
MeOH = Methanol
IA = Itaconic Acid
*Rel. Humid. at 85%

The data in the table above shows that the combination of CPPDATMS in 5 g of itaconic acid, in methanol (MeOH) and water shows the most favorable overall improvements in oxygen transmission rates, reducing same by about 20 fold over the untreated control group which had a dry oxygen transmission rates of 2300 cc/m²/day. More importantly, the low oxygen permeability was maintained over a wide range of relative humidity—a property that is critical for the packaging application. However, the other films with the CPPDATMS coating also performed well, each showing one order of magnitude decrease in oxygen transmission rates over the control.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

What is Claimed:

1. A method for producing a silane coated substrate, comprising:
   (I) coating a plastic substrate with a silane solution comprising
      (A) an organosilicon compound selected from the group consisting of silanes corresponding to the molecular formula $Q(R^1O)_3Si$ where Q represents the radical $R^2(CH=CH)_n-CH=CR^3C(O)R^5-$, each $R^1$ is individually selected from the group consisting of unsubstituted monovalent. hydrocarbon radicals, $R^2$ represents an aryl, alkoxyaryl or alkaryl radical, $R^3$ is $-C\equiv N$ or $-C(O)OR^4$ where $R^4$ is hydrogen or an unsubstituted monovalent hydrocarbon radical selected from the same group as $R^1$, $R^5$ is $O(CH_2)_aCH=CH-$ or $-NR^6-(CH_2)_b-$, $R^6$ is a hydrogen or hydrocarbon radical having from 1 to 6 carbon atoms, a is 1 to 5, b is 3 to 6, and n is 0 or a positive integer, with the proviso that n can be 0 only when $R^2$ represents a naphthyl radical;
      (B) itaconic acid;
      (C) water; and
      (D) a solvent; and
   (II) curing the silane solution to a silicone resin with ultraviolet light.

2. The method of claim 1 wherein the solvent methanol or methyl ethyl ketone.

3. The method of claim 1, wherein said silane solution is made from the following reactants comprising:

(a) propargyl 2-cyano-5-phenyl-2,4,-pentadienoate;
   (b) toluene;
   (c) a platinum catalyst; and
   (d) trimethoxy silane.

4. The method of claim 1, wherein said silane solution is made from the following reactants comprising:
   (a) methyl 2-cyano-5-phenyl-2,4-pentadienoate;
   (b) 3-aminopropyltrimethoxysilane;
   (c) toluene.

5. A coating composition, comprising:
   (A) an organosilicon compound selected from the group consisting of silanes corresponding to the molecular formula $Q(R^1O)_3Si$ where Q represents the radical $R^2(CH=CH)_n-CH=CR^3C(O)R^5-$, each $R^1$ is individually selected from the group consisting of unsubstituted monovalent hydrocarbon radicals, $R^2$ represents an aryl, alkoxyaryl or alkaryl radical, $R^3$ is $-C\equiv N$ or $-C(O)OR^4$ where $R^4$ is hydrogen or an unsubstituted monovalent hydrocarbon radical selected from the same group as $R^1$, $R^5$ is $-O(CH_2)_aCH=CH-$ or $-NR^6-(CH_2)_b'$, $R^6$ is a hydrogen or hydrocarbon radical having from 1 to 6 carbon atoms, a is 1 to 5, b is 3 to 6, and n is 0 or a positive integer, with the proviso that n can be 0 only when $R^2$ represents a naphthyl radical;
   (B) itaconic acid;
   (C) water; and
   (D) a solvent 6. The coating composition of claim 5 wherein the solvent is methanol or methyl ethyl ketone.

7. The coating composition of claim 5 wherein the composition is made from the following reactants comprising:
   (a) propargyl 2-cyano-5-phenyl-2,4-pentadienoate;
   (b) toluene;
   (c) a platinum catalyst; and
   (d) trimethoxy silane.

8. The coating composition of claim 5 wherein the composition is made from the following reactants comprising:
   (a) methyl 2-cyano-5-phenyl-2,4-pentadienoate;
   (b) 3-aminopropyltrimethoxysilane;
   (c) toluene.

* * * * *